United States Patent
Kunkel et al.

(10) Patent No.: US 10,497,162 B2
(45) Date of Patent: *Dec. 3, 2019

(54) SYSTEMS AND METHODS FOR APPEARANCE MAPPING FOR COMPOSITING OVERLAY GRAPHICS

(71) Applicant: DOLBY LABORATORIES LICENSING CORPORATION, San Francisco, CA (US)

(72) Inventors: Timo Kunkel, Kensington, CA (US); Ning Xu, Irvine, CA (US); Tao Chen, Palo Alto, CA (US); Bongsun Lee, Cupertino, CA (US); Samir N. Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,576

(22) Filed: Jul. 17, 2018

(65) Prior Publication Data

US 2018/0322679 A1      Nov. 8, 2018

Related U.S. Application Data

(63) Continuation of application No. 14/768,345, filed as application No. PCT/US2014/013218 on Jan. 27, 2014, now Pat. No. 10,055,866.

(Continued)

(51) Int. Cl.
*G06T 11/60* (2006.01)
*H04N 5/272* (2006.01)
(Continued)

(52) U.S. Cl.
CPC ............ *G06T 11/60* (2013.01); *G06K 9/4652* (2013.01); *G06K 9/4661* (2013.01); *G06K 9/52* (2013.01);
(Continued)

(58) Field of Classification Search
None
See application file for complete search history.

(56) References Cited

U.S. PATENT DOCUMENTS 6,571,255 B1    5/2003    Gonsalves
6,980,224 B2   12/2005    Wiant, Jr.
(Continued)

FOREIGN PATENT DOCUMENTS

CN    101438579    5/2009
EP    2230839      9/2010
(Continued)

OTHER PUBLICATIONS

Banterle, F. et al "Expanding Low Dynamic Range Videos for High Dynamic Range Applications" ACM Spring Conference on Computer Graphics, Apr. 21, 2008, pp. 1-8.

*Primary Examiner* — Ryan M Gray

(57) ABSTRACT

Systems and methods for overlaying a second image/video data onto a first image/video data are described herein. The first image/video data may be intended to be rendered on a display with certain characteristics—e.g., HDR, EDR, VDR or UHD capabilities. The second image/video data may comprise graphics, closed captioning, text, advertisement—or any data that may be desired to be overlaid and/or composited onto the first image/video data. The second image/video data may be appearance mapped according to the image statistics and/or characteristics of the first image/video data. In addition, such appearance mapping may be made according to the characteristics of the display that the composite data is to be rendered. Such appearance mapping is desired to render a composite data that is visually pleasing to a viewer, rendered upon a desired display.

14 Claims, 11 Drawing Sheets

Related U.S. Application Data

(60) Provisional application No. 61/767,553, filed on Feb. 21, 2013.

(51) Int. Cl.

| | | |
|---|---|---|
| *H04N 5/445* | (2011.01) | |
| *H04N 21/431* | (2011.01) | |
| *H04N 21/462* | (2011.01) | |
| *H04N 21/81* | (2011.01) | |
| *G09G 5/10* | (2006.01) | |
| *G06T 7/90* | (2017.01) | |
| *G06K 9/46* | (2006.01) | |
| *G06K 9/52* | (2006.01) | |
| *G06K 9/62* | (2006.01) | |
| *H04N 5/58* | (2006.01) | |
| *H04N 9/67* | (2006.01) | |
| *H04N 21/41* | (2011.01) | |
| *H04N 21/422* | (2011.01) | |
| *H04N 21/488* | (2011.01) | |
| *G06F 3/14* | (2006.01) | |

(52) U.S. Cl.
CPC ............. *G06K 9/6201* (2013.01); *G06T 7/90* (2017.01); *G09G 5/10* (2013.01); *H04N 5/2723* (2013.01); *H04N 5/445* (2013.01); *H04N 5/58* (2013.01); *H04N 9/67* (2013.01); *H04N 21/4122* (2013.01); *H04N 21/42202* (2013.01); *H04N 21/431* (2013.01); *H04N 21/4318* (2013.01); *H04N 21/4622* (2013.01); *H04N 21/812* (2013.01); *H04N 21/8146* (2013.01); *G06F 3/1454* (2013.01); *G09G 2320/08* (2013.01); *G09G 2340/10* (2013.01); *G09G 2340/12* (2013.01); *G09G 2360/144* (2013.01); *G09G 2370/04* (2013.01); *H04N 21/4884* (2013.01)

(56) References Cited

U.S. PATENT DOCUMENTS

| | | | |
|---|---|---|---|
| 7,050,109 B2 | 5/2006 | Safadi | |
| 7,064,759 B1 | 6/2006 | Feierbach | |
| 7,184,063 B2 | 2/2007 | Shum | |
| 7,394,565 B2 | 7/2008 | Stokes | |
| 7,894,524 B2 | 2/2011 | Demos | |
| 7,961,784 B2 | 6/2011 | Demos | |
| 8,050,323 B2 | 11/2011 | Demos | |
| 8,091,038 B1 | 1/2012 | Johnson | |
| 8,422,795 B2 | 4/2013 | Pahalawatta | |
| 8,477,851 B2 | 7/2013 | Demos | |
| 8,483,479 B2 | 7/2013 | Kunkel | |
| 8,525,933 B2 | 9/2013 | Atkins | |
| 8,594,188 B2 | 11/2013 | Demos | |
| 8,660,352 B2 | 2/2014 | Gish | |
| 8,736,674 B2 | 5/2014 | Hovanky | |
| 8,760,578 B2 | 6/2014 | Li | |
| 8,767,004 B2 | 7/2014 | Longhurst | |
| 8,786,585 B2 | 7/2014 | Longhurst | |
| 8,831,343 B2 | 9/2014 | Kunkel | |
| 8,836,796 B2 | 9/2014 | Dickins | |
| 8,891,863 B2 | 11/2014 | Ninan | |
| 8,891,934 B2 | 11/2014 | Messmer | |
| 8,982,963 B2 | 3/2015 | Gish | |
| 8,994,714 B2 | 3/2015 | Erinjippurath | |
| 9,060,180 B2 | 6/2015 | Gish | |
| 9,117,385 B2 | 8/2015 | Todd | |
| 10,097,822 B2 * | 10/2018 | Newton | G09G 5/006 |
| 2003/0046401 A1 | 3/2003 | Abbott | |
| 2004/0218097 A1 | 11/2004 | Huang | |
| 2007/0121005 A1 | 5/2007 | Gutta | |
| 2007/0288844 A1 | 12/2007 | Zingher | |
| 2008/0129877 A1 | 6/2008 | Ohno | |
| 2008/0307342 A1 | 12/2008 | Furches | |
| 2009/0086816 A1 | 4/2009 | Leontaris | |
| 2009/0322800 A1 | 12/2009 | Atkins | |
| 2010/0053222 A1 * | 3/2010 | Kerofsky | G09G 3/3406 345/690 |
| 2010/0110000 A1 | 5/2010 | De Greef | |
| 2010/0150526 A1 | 6/2010 | Rose | |
| 2010/0158099 A1 | 6/2010 | Kalva | |
| 2010/0231603 A1 | 9/2010 | Kang | |
| 2012/0038782 A1 | 2/2012 | Messmer | |
| 2012/0218290 A1 | 8/2012 | Waschbuesch | |
| 2012/0299817 A1 | 11/2012 | Atkins | |
| 2012/0315011 A1 | 12/2012 | Messmer | |
| 2014/0023614 A1 | 1/2014 | Barawkar | |
| 2014/0168277 A1 | 6/2014 | Ashley | |
| 2014/0210847 A1 * | 7/2014 | Knibbeler | G09G 5/006 345/589 |
| 2014/0225941 A1 * | 8/2014 | Van der Vleuten | G09G 5/006 345/690 |

FOREIGN PATENT DOCUMENTS

| | | |
|---|---|---|
| JP | 2000-050158 | 2/2000 |
| JP | 2000-286880 | 10/2000 |
| JP | 2009-081542 | 4/2009 |
| JP | 2012-501099 | 1/2012 |
| JP | 2012-521133 | 9/2012 |
| WO | 2012/172460 | 12/2012 |

\* cited by examiner

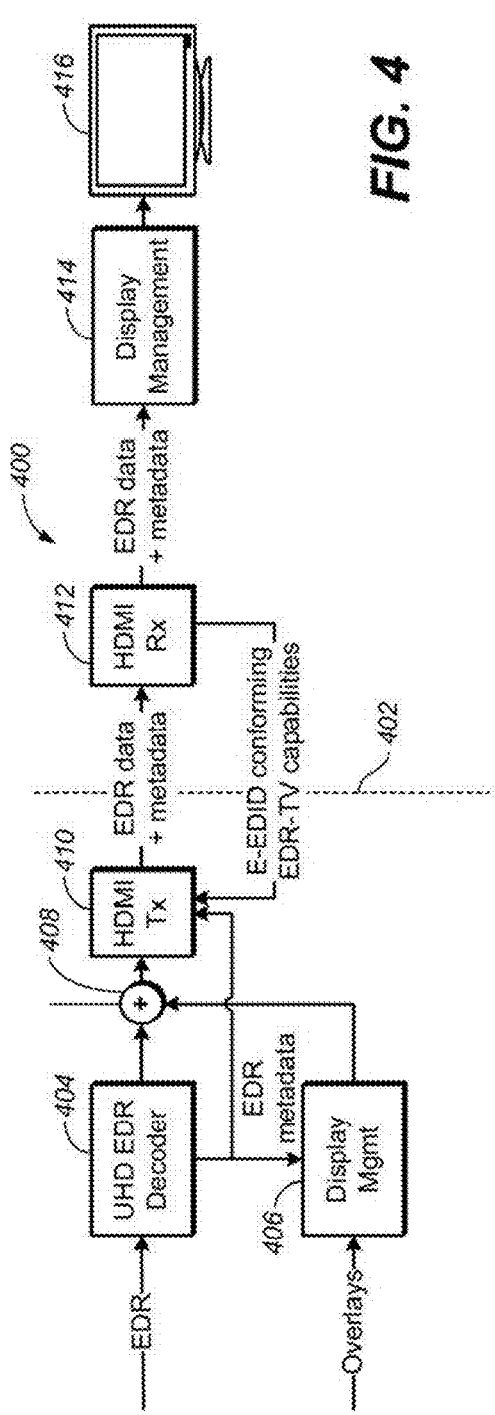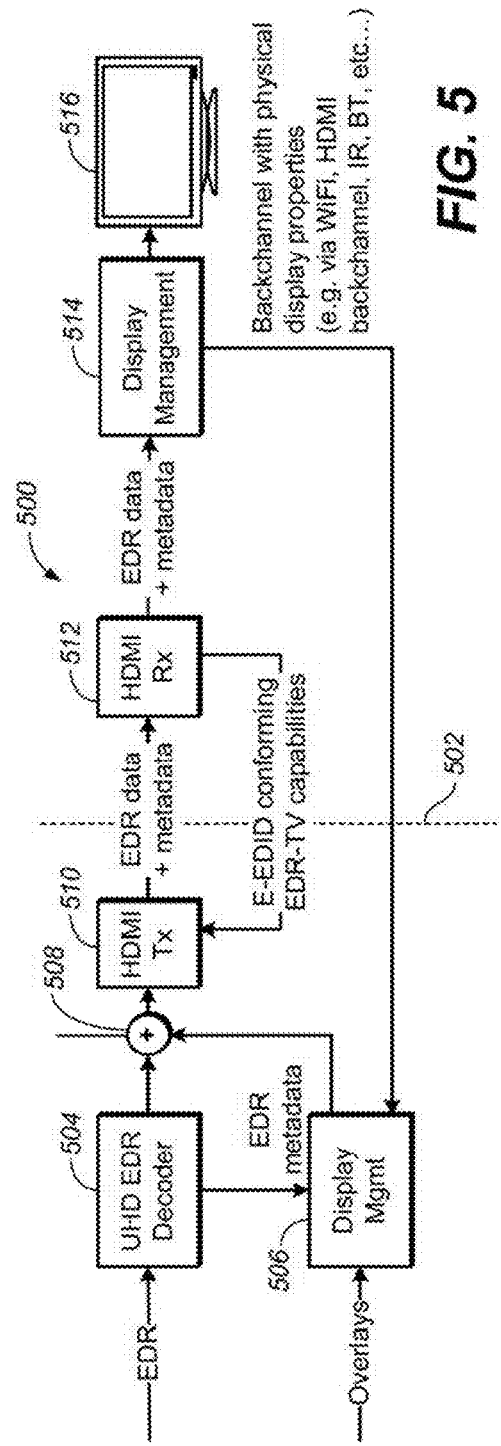

SYSTEMS AND METHODS FOR APPEARANCE MAPPING FOR COMPOSITING OVERLAY GRAPHICS

CROSS-REFERENCE TO RELATED APPLICATIONS

This application is a continuation of U.S. patent application Ser. No. 14/768,345, filed Aug. 17, 2015, which in turn is the 371 national stage of PCT/US2014/013218, filed Jan. 27, 2014. PCT/US2014/013218 claims priority to U.S. Provisional Patent Application No. 61/767,553, filed on Feb. 21, 2013, each of which is hereby incorporated by reference in its entirety. This application is also related to U.S. Provisional Patent Application No. 61/767,522, filed on Feb. 21, 2013, which is hereby incorporated by reference in its entirety.

TECHNICAL FIELD

The present invention relates to image processing and, more particularly, to methods and systems for mapping graphics and composite images onto image/video data.

BACKGROUND

Dynamic range (DR) relates to a span of intensity (e.g., luminance, luma) in an image. The DR in real-world scenes is usually large. Different image and video applications for the capture, representation, and presentation of image and video signals may have different DR. For example, photographic negatives can have a relatively large dynamic range, while photographic prints, some currently existing (e.g., conventional) television (TV) sets, and computer monitors may have a smaller DR.

DR also relates to a capability of the human psychovisual system (HVS) to perceive a range of intensity (e.g., luminance, luma) in an image, e.g., from darkest darks to brightest brights. In this sense, DR relates to a "scene-referred" intensity. DR may also relate to the ability of a display device to adequately or approximately render an intensity range of a particular breadth. In this sense, DR relates to a "display-referred" intensity. In another sense, DR may also refer to a "signal-referred" intensity—which may be to some extent theoretical. For example, a VDR signal may range up to 10,000 nits and HDR signals may range even higher. Most of the time, there are no grading displays for that range. Unless a particular sense is explicitly specified to have particular significance at any point in the description herein, it should be inferred that the term may be used in either sense, e.g. interchangeably.

Rendering by conventional TV sets and computer monitors is often constrained to approximately three orders of magnitude of dynamic range—typifying a low dynamic range (LDR), also referred to as a standard dynamic range (SDR). In contrast to LDR images, high dynamic range (HDR) images contain essentially all of the dynamic range in an original scene. HDR can span some 14-15 orders of magnitude of dynamic range. HDR images can be represented by any bit depth, but typically 10-16 bits or more are used to reduce overly large step sizes.

For a number of applications such as compression for distribution, encoding for HDR images may unnecessary and may in fact be somewhat computationally expensive or bandwidth consumptive. On the other hand, LDR images may simply not suffice either. Instead, such applications may advantageously use, create, store, transmit or render images that may be characterized by a visual dynamic range or variable dynamic range, VDR. VDR images, truncated in relation to HDR, encompass essentially all of the luminance and color that a typical HVS can simultaneously perceive (e.g., visually perceive at any given time). VDR spans about 5-6 orders of magnitude of dynamic range. Thus while narrower in relation to HDR, VDR nonetheless represents a wide DR breadth. Despite the DR differences between HDR and VDR images, the term EDR, as used herein, characterizes any image with an extended dynamic range compared to LDR.

SUMMARY

Several embodiments of display systems and methods of their manufacture and use are herein disclosed.

Systems and methods for overlaying a second image/video data onto a first image/video data are described herein. The first image/video data may be intended to be rendered on a display with certain characteristics—e.g., HDR, EDR, VDR or ultra-high definition (UHD, e.g., 4K or 8K horizontal resolution) capabilities. The second image/video data may comprise graphics, closed captioning, text, advertisement—or any data that may be desired to be overlaid and/or composited onto the first image/video data. The second image/video data may be appearance mapped according to the image statistics and/or characteristics of the first image/video data. In addition, such appearance mapping may be made according to the characteristics of the display that the composite data is to be rendered. Such appearance mapping is desired to render a composite data that is visually pleasing to a viewer, rendered upon a desired display.

In one embodiment, a method for overlaying a second image data over a first image data is disclosed—comprising: receiving a first image and a second image, the first image differing in dynamic range and size than the second image; receiving first metadata regarding the first image; receiving second metadata regarding the second image; performing appearance mapping of the second image to determine an adjusted second image, said adjusted second image differing in dynamic range than the second image, according to the first metadata and the second metadata; and forming a composite image overlaying the adjusted second image onto at least a portion of the first image In another embodiment, a system for compositing a second image data onto a first image data is disclosed—comprising: a display management module, the display management module capable of receiving a first image; a compositor module, said compositor module capable of receiving a second image; wherein further said compositor module capable of receiving metadata regarding the first image and capable of performing appearance mapping the second image to form an appearance mapped second image in accordance with said metadata regarding the first image; and a mixing module, said mixing module capable of mixing the appearance mapped second image onto the first image to form a composite image, the composite image intended to be rendered upon a display.

In another embodiment, systems and methods for dynamic advertising is disclosed in which an existing composite image—formed from a first image/video data with a second overlaid image/video data—may be mapped and/or converted into another composite image where all or a part of the second overlaid image/video data may be replaced by a third overlaid image/video data.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 4 and 5 are two embodiments of a present system that may affect a visually pleasing composite image/video signal upon EDR/VDR-capable displays.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

INTRODUCTION

In a typical visual experience with current legacy consumer TVs, there is very little control over the appearance and mapping of the incoming video stream using standards such as Rec.709 and DCI Specs. This is particularly true of graphic or video overlays that may be desired to be integrated onto a first video stream, mixed and then rendered for viewing by an individual. In one embodiment of the present system, it may be desirable to provide suitable image processing and/or mixing of such overlays onto a first image/video data stream in such a manner as to provide appearance matching and/or an improved visual experience for a viewer of the composite image and/or video.

Figure 1:
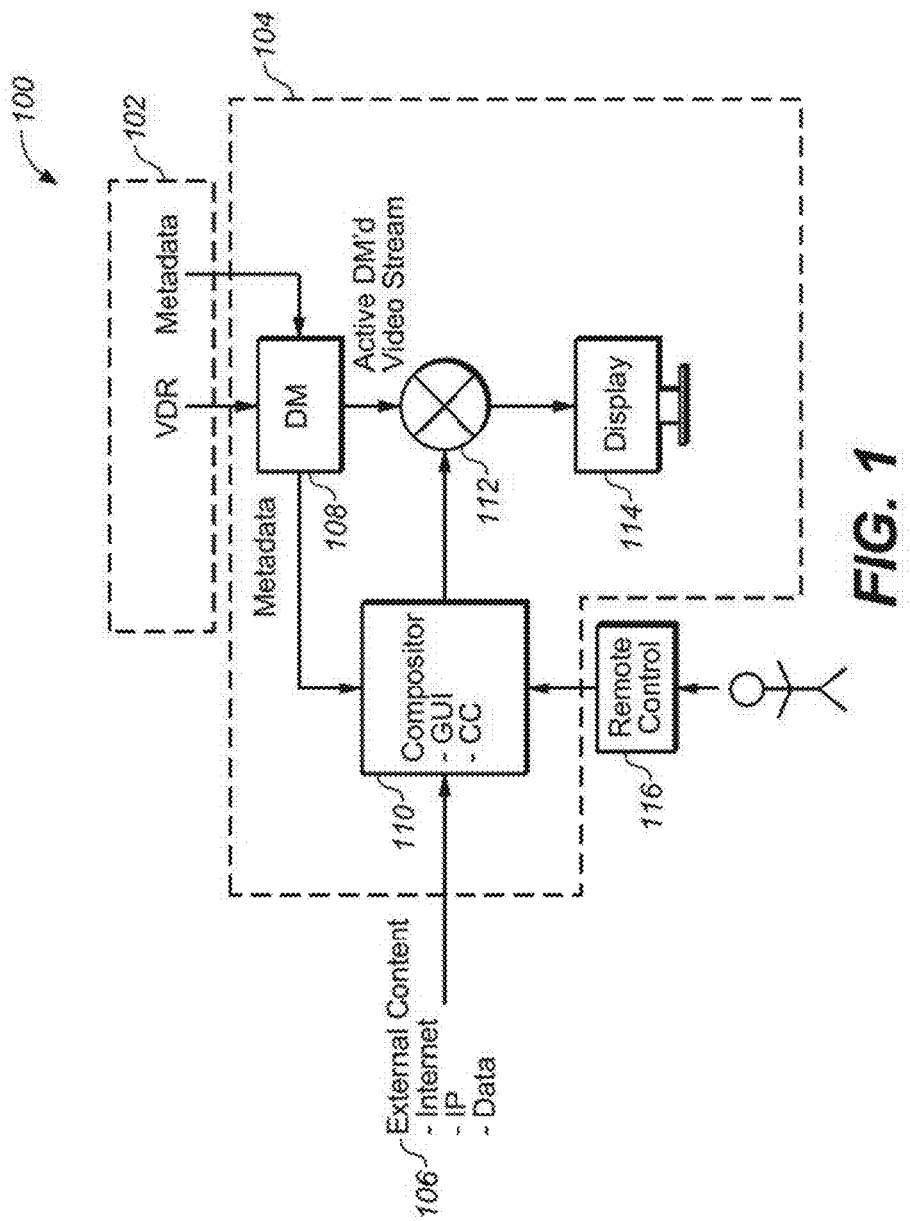
FIG. 1 shows one exemplary environment in which one embodiment of the present application may operate.

FIG. 1 illustrates an environment (100) in which one embodiment of a system (104) made in accordance with the present application. In this environment (100), a present system 104 may receive a first data and/or metadata 102 (e.g., VDR, EDR, HDR or some other image and/or video data/metadata) to be rendered on a display 114. In addition, there may be another stream of external data/content 106 (e.g., from a potential plurality of sources—Internet, IP, other data sources, etc.). This other stream of data/content may represent graphics, images and/or video that is to be composited or otherwise mixed with the first data stream. It should be appreciated that streams 102 and 106 may also come to the system 104 from the same source and in the same manner.

Data stream 102 may be input into a Display Management (DM) module 108 for image processing suitable for rendering onto display 114. Compositor 110 may be another image processing/video processing module that inputs the composite data stream (106)—as well as data and/or metadata from DM 108. Compositor 110 may format the composite data stream as GUI, Closed Captioning (CC), Picture In Picture (PIP) or any other possible format for the composite data to be mixed and/or composited with the first data stream. Metadata may also include metadata regarding the rendering characteristics of the display upon which the composite image may be rendered. Such metadata may include avg., min/mean/max luminance, reflective white, whitepoint, color gamut and any other known image rendering characteristic and/or specification.

A viewer may have optional control input to the compositor 110—e.g., via a remote control, laptop, tablet, smart phone or another suitable controller (116)—in order to input viewer desires or demands for such composite rendering.

The composite image/video data and the first video stream (after whatever processing has been applied by DM 108) may be input to a mixing module 112. Mixing module 112 may suitably overlay the composite image/video data onto the first data stream—e.g., using any advanced image/video processing algorithm described herein and as known—to provide a pleasant viewing experience. As described further herein, such a pleasant viewing experience may be enhanced by appearance matching the composite image/video data to the characteristics of the first image data and/or the characteristics of the display (114) on which the final composite image/video is to be rendered.

It should be appreciated that—although the DM, compositor and the mixing modules may be resident in the display itself (as functional modules)—it is possible that DM, compositor and mixing modules may physically reside elsewhere and may be remote from each other. For example, it may be possible to place one or more of these modules in a set top box and have it be in communication with display (e.g., by any known wired or wireless configuration). In another embodiment, DM, compositor and/or mixer may be out of the physical room where the display resides. In other embodiments, it may be possible to place the functionality of any or all three of these modules into a single module. For example, a DM module may be constructed to include the functionality of typical DMs—as well as the functionality of the compositor and the mixer.

In one embodiment, it may be desirable to have an image statistics calculating module for the calculation of various statistics known in image processing (as also described further herein). Such statistics (e.g., of the first image/video data, second overlay image/video data and the like) may be used further by the present system to aid in the appearance mapping of the second overlay image/video data onto the first image/video data. Any of the modules mentioned herein may incorporate the image statistics module, as is known in the art to do.

In one embodiment, these modules may reside at an image/video front end supplier (e.g., cable operator, satellite operator and/or other media suppliers). Thus, it may be desirable to distinguish and/or note where the graphics overlay is injected into the content, —e.g., generated at the content creation side (e.g., subtitle), the broadcasting company (e.g., logos), Set Top Box (e.g., UI, TV guide, cc), TV itself (e.g. UI), AV receiver (e.g., volume bar graphics overlay, or any signal switch/modifier/AV processor that may add graphics or modify the input video stream otherwise. At any such stage, the overlay and compositing may be dealt with differently. It may also be desirable to have the UI and overlay injection points be aware of each other (i.e., pipeline-awareness). In such a case, it may be possible to avoid re-analyze and re-map UI graphics already embedded into the video stream (e.g. broadcast logos are commonly embedded early in the stream). Beside of general UI rendering, all this information may also be provided to the operating system of the playout device so that for example a web browser running on a smart TV can access it.

As mentioned above, in one embodiment, the video stream may be a HDR, EDR and/or VDR data/metadata stream and, as such, some portion of the video processing system may affect HDR, EDR and/or VDR image/video processing. Various systems, techniques and/or technologies involving HDR, EDR and VDR data and metadata processing may be found in the following co-owned patent applications:

(1) United States Patent Application 20130027615 to Li, published Jan. 31, 2013 and entitled "QUALITY ASSESSMENT OF HIGH DYNAMIC RANGE, VISUAL DYNAMIC RANGE AND WIDE COLOR GAMUT IMAGE AND VIDEO";
(2) United States Patent Application 20130004074 to Gish, published on Jan. 3, 2013 and entitled "QUALITY ASSESSMENT OF IMAGES WITH EXTENDED DYNAMIC RANGE";
(3) United States Patent Application 20120321273 to Messmer, published on Dec. 20, 2012 and entitled "VIDEO DISPLAY CONTROL USING EMBEDDED METADATA";
(4) United States Patent Application 20120315011 to Messmer et al., published on Dec. 13, 2012 and entitled "VIDEO DELIVERY AND CONTROL BY OVERWRITING VIDEO DATA";
(5) United States Patent Application 20120314944 to Ninan et al., published on Dec. 13, 2012 and entitled "HIGH DYNAMIC RANGE, BACKWARDS-COMPATIBLE, DIGITAL CINEMA";
(6) United States Patent Application 20120314773 to Gish et al., published on Dec. 13, 2012 and entitled "DRIFT-FREE, BACKWARDS COMPATIBLE, LAYERED VDR CODING";
(7) United States Patent Application 20120299817 to Atkins et al., published on Nov. 29, 2012 and entitled "SYSTEMS AND METHODS OF IMAGE PROCESSING THAT ADJUST FOR VIEWER POSITION, SCREEN SIZE AND VIEWING DISTANCE";
(8) United States Patent Application 20120229495 to Longhurst, published on Sep. 13, 2012 and entitled "INTERPOLATION OF COLOR GAMUT FOR DISPLAY ON TARGET DISPLAY";
(9) United States Patent Application 20120038782 to Messmer et al., published on Feb. 16, 2012 and entitled "VDR METADATA TIMESTAMP TO ENHANCE DATA COHERENCY AND POTENTIAL OF METADATA";
(10) United States Patent Application 20090322800 to Atkins, published on Dec. 31, 2009 and entitled "METHOD AND APPARATUS IN VARIOUS EMBODIMENTS FOR HDR IMPLEMENTATION IN DISPLAY DEVICES";
(11) United States Patent Application 20130004074 to Gish, published on Jan. 3, 2013 and entitled "QUALITY ASSESSMENT OF IMAGES WITH EXTENDED DYNAMIC RANGE";
(12) United States Patent Application 20100118957 to Demos, published on May 13, 2010 and entitled "VIDEO IMAGE COMPRESSION USING UNEQUAL WEIGHTS";
(13) United States Patent Application 20100014587 to Demos, published on Jan. 21, 2010 and entitled "INTERPOLATION OF VIDEO COMPRESSION FRAMES";
(14) United States Patent Application 20080273809 to Demos, published on Nov. 6, 2008 and entitled "METHOD AND SYSTEM FOR IMPROVING COMPRESSED IMAGE CHROMA INFORMATION";
(15) United States Patent Application 20070268967 to Demos, published on Nov. 22, 2007 and entitled "INTERPOLATION OF VIDEO COMPRESSION FRAMES";
(16) United States Patent Application 20110103470 to Demos et al., published on May 5, 2011 and entitled "HIGH PRECISION ENCODING AND DECODING OF VIDEO IMAGES"

all of which are herein incorporated by reference in their entirety.

In addition, Display Management subsystems may comprise a part of the system for providing a pleasing viewing experience for such composited image/video data on a first data stream. DM systems typically comprise a processor, computer readable storage and a set of computer readable instructions that are suitable to affect a wide array of image processing algorithms and techniques—e.g., luminance mapping, color gamut mapping, dynamic range mapping.

DM systems are further described in the following co-owned US patent applications:

(1) United States Patent Application 20120321273 to Messmer, published on Dec. 20, 2012 and entitled "VIDEO DISPLAY CONTROL USING EMBEDDED METADATA";
(2) United States Patent Application 20120315011 to Messmer et al., published on Dec. 13, 2012 and entitled "VIDEO DELIVERY AND CONTROL BY OVERWRITING VIDEO DATA";
(3) United States Patent Application 20120229495 to Longhurst, published on Sep. 13, 2012 and entitled "INTERPOLATION OF COLOR GAMUT FOR DISPLAY ON TARGET DISPLAY";
(4) United States Patent Application 20120200593 to Todd et al., published on Aug. 9, 2012 and entitled "RESOLUTION MANAGEMENT FOR MULTIVIEW DISPLAY TECHNOLOGIES";
(5) United States Patent Application 20120127324 Dickens et al., published on May 24, 2012 and entitled "METHOD AND SYSTEM FOR DISPLAY CHARACTERIZATION OR CALIBRATION USING A CAMERA DEVICE";
(6) United States Patent Application 20120075435 to Hovanky et al., published on Mar. 29, 2012 and entitled "METHOD AND SYSTEM FOR 3D DISPLAY CALIBRATION WITH FEEDBACK DETERMINED BY A CAMERA DEVICE";

(7) United States Patent Application 20120074851 to Erinjippurath, published on Mar. 29, 2012 and entitled "METHOD AND SYSTEM FOR DISPLAY CALIBRATION WITH FEEDBACK DETERMINED BY A CAMERA DEVICE";

(8) United States Patent Application 20110311147 to Pahalawatta et al., published on Dec. 22, 2011 and entitled "QUALITY EVALUATION OF SEQUENCES OF IMAGES";

(9) United States Patent Application 20110194618 to Gish et al., published on Aug. 11, 2011 and entitled "COMPATIBLE COMPRESSION OF HIGH DYNAMIC RANGE, VISUAL DYNAMIC RANGE, AND WIDE COLOR GAMUT VIDEO";

(10) United States Patent Application 20090086816 to Leontaris et al., published on Apr. 2, 2009 and entitled "VIDEO COMPRESSION AND TRANSMISSION TECHNIQUES"

all of which are hereby incorporated by reference in their entirety.

One Composite Image Example

In one embodiment, to provide a pleasing visual experience, it may be desirable to mix the composite signal with the first image/video signal in accordance with the characteristics of the first signal and/or the characteristics of the display. For example, as video and display technology improves, there is a trend to moving towards displays that are capable of rendering VDR/EDR/HDR data. Such data—and displays that are capable of rendering such data—provide suitable means to faithfully reproduce a movie/video in the way the director intended—i.e., to within the capabilities of the display hardware used to show and/or render the data. In one instance, higher luminance levels especially for highlights may be reproduced—which was not typically possible with legacy approaches.

Apart from the higher quality image/video data distributed to the display/TV, other image elements (not comprising necessarily the actual movie/video content) are other user interface elements—e.g., menus, cursors and other on screen display elements such as close captioning or BluRay disc menus. However, the appearance rendering of those elements is typically not defined in EDR/VDR—nor is typically with respect to legacy video.

Thus, one embodiment of a present system affects a perceptually accurate rendering of user interface elements on a display device using the system and methods disclosed herein—to affect a colorimetricy, perceptual and aesthetically correct rendering of those before-mentioned user interface (UI) elements and other image/video content.

Figures 2A, 2B:
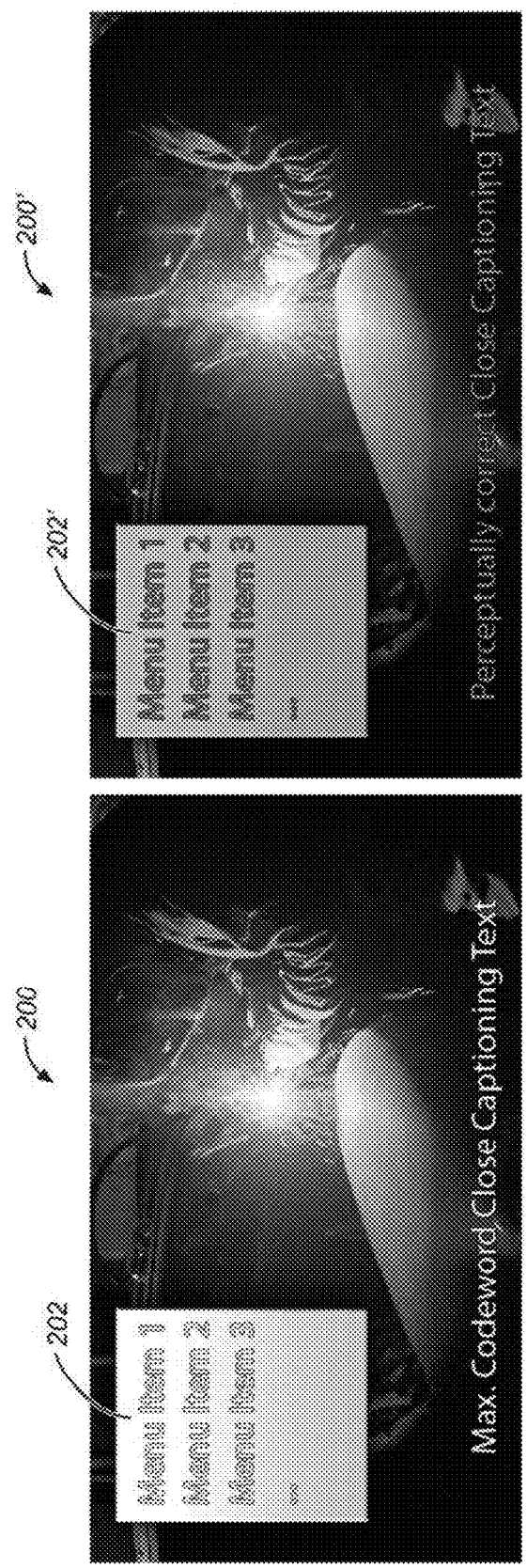
FIGS. 2A and 2B show two examples of a rendered image comprising a EDR/VDR image data and an overlay of graphics and closed captioning, first without appearance mapping and then with appearance mapping applied, respectively.

FIGS. 2A and 2B are two examples of a rendered image (200 and 200', respectively). In image 200, there is depicted an image comprising high dynamic range contrast —e.g., portions of very high luminance (as seen by the light of the arc welder) in proximity to very dark portions (as seen in the shadows, e.g. where word "Text" is displayed). In addition, there are graphics and text elements overlaid that have been composited with the high dynamic range image (e.g. menu 202 and the captioning reading "Max. Codeword Closed Captioning Text").

There are many visual features to note in FIG. 2A. For example, it may be seen that the menu 202 exhibits luminance banding—i.e., a gradation of luminance, with high luminance at the top, with a tapering to darker luminance at the bottom. In addition, it may be seen that the Closed Captioning is sent to the display at maximum codeword intensity level which may lead to the text being displayed at the same luminance as, e.g., the welding torch flame. This may seem distracting or create discomfort to a viewer of the text due to the intense brightness, especially if there are also areas of lower luminance in the first image/video portions (e.g. around the word "Text").

Examining the legacy approach of FIG. 2A, white text rendered as full code word would tend to be too bright on an EDR/VDR TV. Instead, text on an EDR TV may be rendered with a reflective white level (e.g. 300 cd/m$^2$) and the prevailing white point (here CCT of 4000K). It may be noted that the above images appear as may be graded for 4000 cd/m$^2$ max. Displayed on such a capable TV, the text in FIG. 2B would appear as reflective (or similar to "paper white") while the one in FIG. 2A would appear glowing.

While the rendering of the white menu text with the maximum possible code value (e.g., slightly below EDR code value 4096 in 12-bit) may tend to cause text to be perceived as glowing, it might also create discomfort due to intense dynamic range difference between text and movie/film background. Instead of rendering with a preset code value, it may be possible to apply an absolute luminance level (e.g., 300 nits or based on results from VDR limits studies) as well as the whitepoint (e.g. averaged over scene, chapter or whole movie), as further defined by the EDR input and display device capabilities. In addition, the extent of the color gamut can be taken into account to adjust the chroma extent that is used by overlaid text and graphics (e.g. avoiding highly saturated green text on a black and white scene).

These effects are also possible for rendering subtitles in DVD and Blu-ray. The subtitles in a lot of movies may be in color. In order to maintain consistency in brightness and colors, it may be desirable to map the overlaid subtitle images to the characteristics of content. This mapping may be affected with scene based parameters since the overlays may later be mapped down to the display capability with the content, where the mapping may be scene-adaptive. The pair of mapping up and down processes may tend to make the subtitles appear perceptually correct and consistent.

By contrast, FIG. 2B shows a composite image 200' comprising the substantially the same high dynamic range image (i.e. the welder in a dark garage) and similar menu (202') and CC text. In this case, the menu 202' and CC text have been composited—according to the characteristics of the first HDR image (and possibly the characteristics of the display rendering it). It may be seen that the new composite image does not exhibit the wide luminance banding/gradation as seen in menu 202. In addition, the high luminance of the text and menu do not distract the viewer from details in the low luminance portions of the first HDR image.

One Embodiment

Figure 3:
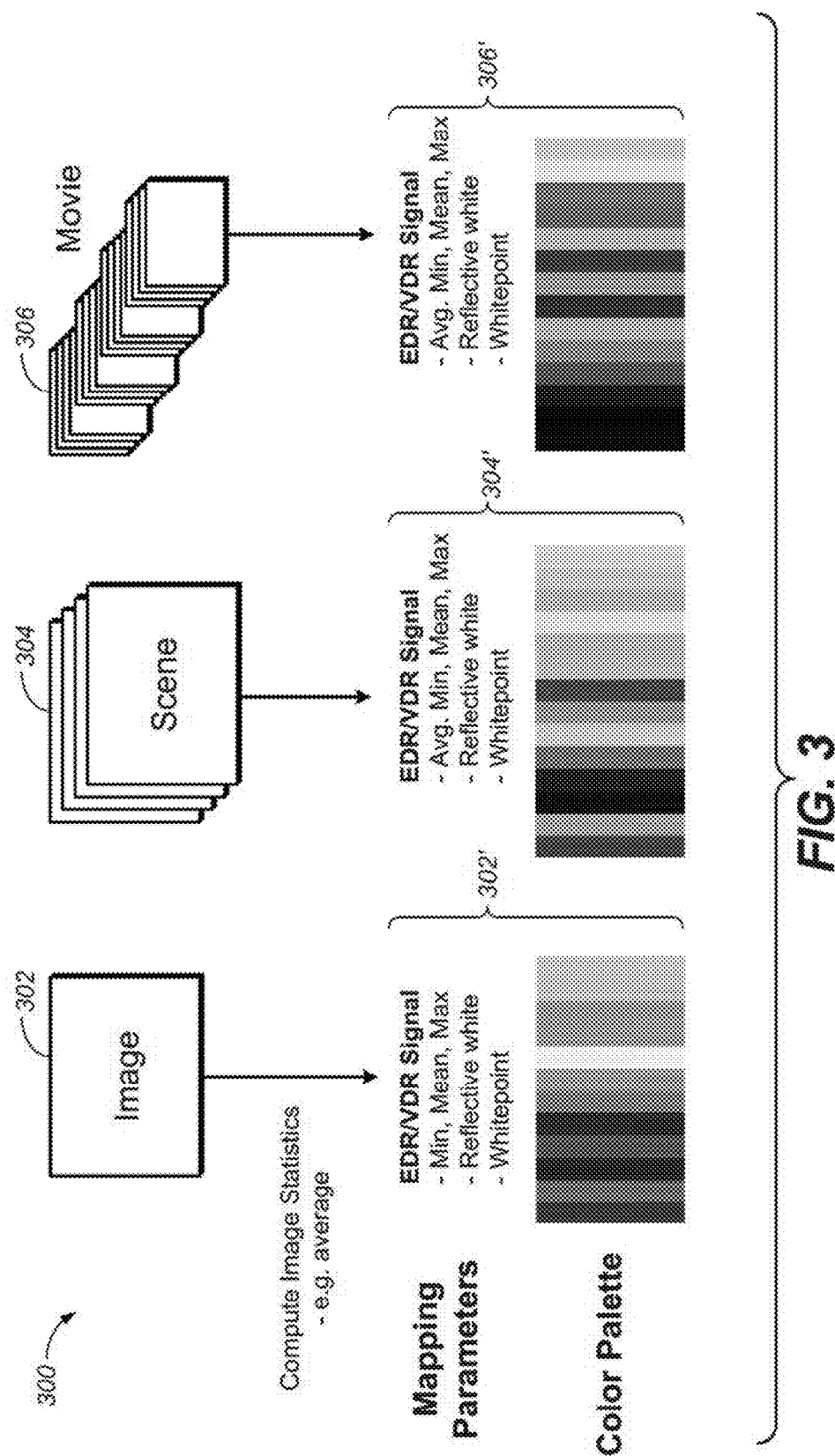
FIG. 3 shows image/video processing of three possible processing scenarios, an image, a scene and a movie, respectively.

FIG. 3 is one embodiment of some image/video processing 300 that may comprise modules and/or processing affected by portions of a present system. FIG. 3 depicts three possible processing scenarios—an image, a scene (e.g., a collection of related images) and a movie (e.g., a collection of related scenes). In the case of the image 302, metadata may be computed and collected. For example, image statistics may be calculated—such as: average luminance, min/mean/max luminance, reflective white, color temperature and/or the whitepoint of the image. For scene 304, the similar statistics may be calculated—for each image within the scene and then computed for the scene itself. For a movie 306, the similar statistics may be calculated—for each image within a scene and then computed for a scene itself and then computed for the entire movie. In addition to image statistics or metadata that is static in nature, there may also be metadata that may characterize the temporal behavior of the changes of images within a scene, or changes of scenes within a movie.

In addition to those image statistics mentioned, a color palette may be computed for each image, scene and/or movie—e.g., by analyzing a histogram, spatial pixel correlations or other image and/or scene intrinsic properties. The combination of image statistics and/or color palette may comprise a set of metadata (e.g. 302', 304' and 306', respectively). In addition, similar metadata may be gathered regarding the capabilities of the display—e.g., luminance (min, mean, max), color temperature, reflective white point, color gamut, primaries, etc. This metadata may then be used by some portion of the system—e.g. compositor, or DM (if that functionality has been incorporated into the DM itself).

Embodiments Involving EDR TV

As previously mentioned, TV and/or displays are exhibiting more capability to render higher dynamic range image/video. EDR/VDR render-capable displays (e.g. Ultra High Definition (UHD) sets) are becoming more accepted by the consumer. As such FIGS. 4 and 5 are two embodiments of a present system that may affect a visually pleasing composite image/video signal to such sets. In FIG. 4, system 400 may start with a UHD EDR decoder 404 may accept a first EDR/VDR/HDR image/video data. At substantially the same time, display management module 406 may accept the overlay and/or other image data to be composited with the input image/video data. The EDR metadata may be computed and shared with the module 406 and module 406 may output processed image data to be composited which may tend to be more visually acceptable to a viewer.

The first image data and the composite image data may be mixed or otherwise overlaid by a mixing module 408. The output of which may be input into a HDMI transmit module 410. Module 410 may accept as input: the EDR metadata, the composited image data (i.e., the first image data mixed with the composite image data)—as well as information regarding the capabilities of the display to display EDR image data.

As seen in FIG. 2A, dotted line 402 may conceptually mark the line at which image and processing comes from outside the display set (e.g., the left hand side of line 402) and processing within the set itself and/or set top box (e.g., right hand side of line 402). As mentioned above, the present system is not necessarily limited to these lines of demarcation—as processing may reside in many parts of this pipeline—without loss of the scope of the present application. This information may come from the EDID of the display. In one embodiment, the TV/display's EDID may inform a STB (or processing further up the chain of image processing) about whether the display is an EDR TV/display or Legacy TV/display. If the display is legacy, the STB (or the like) might want to process the EDR signals and render graphics overlay properly. If the display is EDR-capable, the EDID may be configured to feed information back to the STB (or further up)—which may help to process (e.g., perceptually map) the graphics overlays, while (at the same time) providing more accurate data about the display for a better appearance mapping processing within the TV itself.

The composited signal may be received by HDMI receiver module 412 and may pass that signal through (with or without additional processing) to DM module 414. DM module may provide some additional processing to ensure that the image data is in line with the capabilities of display 416 for a pleasing visual experience for the viewer.

FIG. 5 is yet another embodiment of a present system for processing image/video data on an EDR/VDR enabled display. Similarly numbered elements (e.g., 416 and 516) perform substantially similar functions in both FIGS. 4 and 5. However, in FIG. 5 is may be seen that a backchannel of information regarding the capabilities of the display is send further back in the image processing pipeline—e.g., to the display management module 506 (which is similar to the compositor module in FIG. 1). In this scenario, more of the compositing processing may take place closer to the front end/creator of the first image content. This may be desirable in the case of a content distributor to control more aspects of the overlay content—as will be discussed further herein with regards to advertising.

Embodiment Involving Legacy TV/Displays

Figure 6:
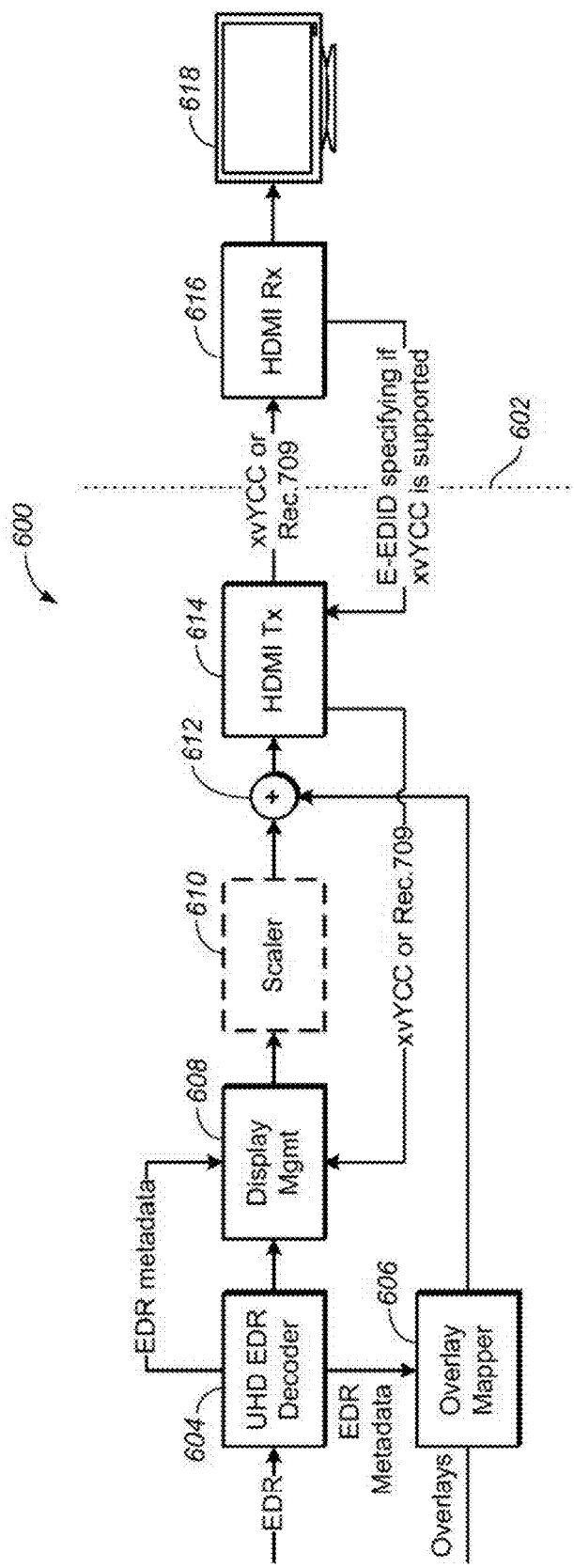
FIG. 6 is one embodiment of a present system that may affect a visually pleasing composite image/video signal upon legacy displays.

FIG. 6 is one embodiment in which the TV/display is a legacy—i.e., has no or very limited capability to display high dynamic range and/or wide color gamut image/video data. In this embodiment, system 600 may receive EDR/VDR image data at decoder 602. Metadata may be computed and sent to overlay mapper 606 which may also receive the overlay/composite image/video data. DM module 608 may receive the first image/video data, EDR metadata and the color gamut data (e.g., xvYCC or Rec 709) of the display— for further processing. An optional scaler 610 may be placed in the image processing pipeline. In one embodiment, a scaler may be used to generate content with native spatial resolution. For example, if the input to UHD EDR decoder 604 has UHD resolution and display 618 has only 1080p, the scaler may reduce the spatial resolution of the input signal to 1080p.

The first image/video data may be mixed or otherwise composited with the composite image/video data at mixer module 612—and thereafter sent to HDMI transceiver 614. Module 614 may receive the display capabilities from HDMI receiver module 616 (via EDID interface) and appropriate image processing may take place to be in accord with display 618 capabilities.

In another embodiment, if a legacy device without EDR capabilities (e.g. PC, games console, VCR, etc.) may display picture-in-picture (PIP) content, it may be desirable that the dynamic range of that content be managed while being superimposed into the VDR image. This management/mapping information may for example be the min/max reflective white and white point from the DM process. In yet another embodiment, if the connected device is a Personal Computer, those values could also be communicated back to the PC (e.g. via HDMI back channel) to adjust the rendering of the graphics card before sending it to the display.

One Processing Embodiment

Figure 7:
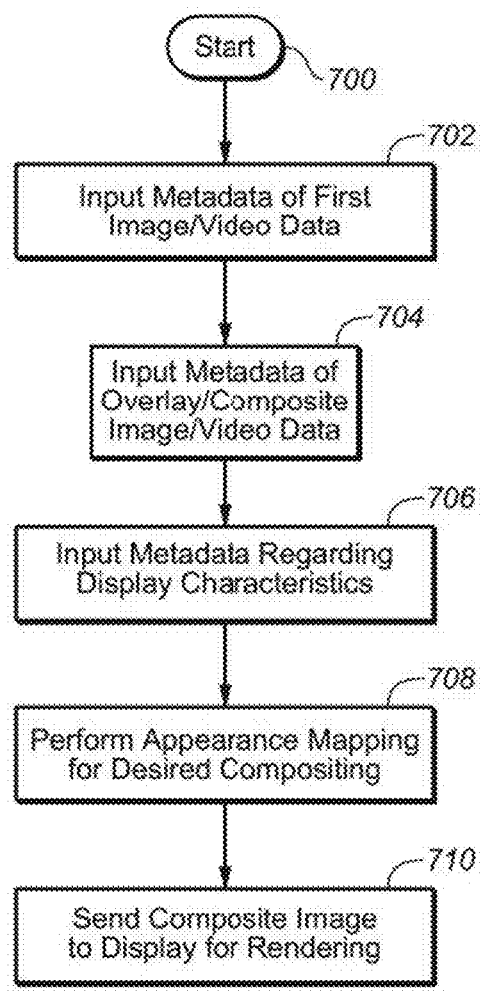
FIG. 7 depicts one exemplary embodiment of the module/routine for appearance mapping overlay/composite image/video data onto a first image/video data for subsequent rendering upon a display.

As with the various embodiments disclosed herein that may encompass a number of possible configurations for overlaying and/or compositing a second image/video data onto a first image/video data, FIG. 7 is one possible embodiment of a compositing processing module and/or routine. Such a processing module/routine (700) may reside within the compositor, the DM module, a combination of such modules—or, alternatively, any place where there is suitable processor and computer readable storage.

Starting at 700, compositing module/routine may input metadata of overlay/composite image/video data (aka, a second image/video data) at 702. Such metadata may be computed and/or compiled as image statistics or color palette (e.g., as previously discussed) or any other known manner (e.g. streaming metadata with the second image/video data). At 704, module/routine may input metadata regarding the first image/video data (e.g., luminance, dynamic range, whitepoint, etc.). Such metadata may be computed and/or compiled as image statistics or color palette (e.g., as previously discussed) or any other known manner (e.g. streaming metadata with the first image/video data). At 706, module/routine may input metadata regarding the characteristics of the display upon which the composited image/video data (i.e. first image/video data together with the overlay/composite image/video data) is to be rendered. At 708, module/routine may perform an appearance mapping or otherwise compositing of the overlay/composite image/video data—that provides a pleasing visual appearance—to form or otherwise create a composite image/video data. This mapping may take into consideration many possible heuristic rules and/or goals that are embedded into the module/routine that provides such a pleasing appearance. Alternatively, the module/routine may perform appearance mapping upon the first image/video data, if desired or appropriate.

Such rule and/or goals may affect approximating good fits to luminance, dynamic range, color gamut, color appearance and the like, using various techniques. Some such methods and/or techniques for modifying display setting (e.g., dynamic range and implementing color appearance models) are further disclosed in co-owned US Patent Applications:

(1) United States Patent Application 20120051635 to Kunkel et al., published on Mar. 1, 2012 and entitled "LIGHT DETECTION, COLOR APPEARANCE MODELS, AND MODIFYING DYNAMIC RANGE FOR IMAGE DISPLAY";

(2) United States Patent Application 20110305391 to Kunkel et al., published on Dec. 15, 2011 and entitled "IMAGE PROCESSING AND DISPLAYING METHODS FOR DEVICES THAT IMPLEMENT COLOR APPEARANCE MODELS";

(3) United States Patent Application 20120320014 to Longhurst et al., published on Dec. 20, 2012 and entitled "SYSTEM AND METHOD FOR ADJUSTING DISPLAY BASED ON DETECTED ENVIRONMENT";

(4) United States Patent Application 20120026405 to Atkins et al., published on Feb. 2, 2012 and entitled "SYSTEM AND METHOD OF CREATING OR APPROVING MULTIPLE VIDEO STREAMS";

(5) United States Patent Application Number 20100231603 to Kang, published Sep. 16, 2010 and entitled "ARTIFACT MITIGATION METHOD AND APPARATUS FOR IMAGES GENERATED USING THREE DIMENSIONAL COLOR SYNTHESIS"

all of which are incorporated by reference in their entirety.

Once such mapping are calculated and/or approximated, then the composite image may be formed and the resulting image/video data may be sent forward to the display at 710. This processing may continue indefinitely while there are images/video to be overlaid occur.

Embodiment of HDR/EDR/VDR Processing

Figure 8:
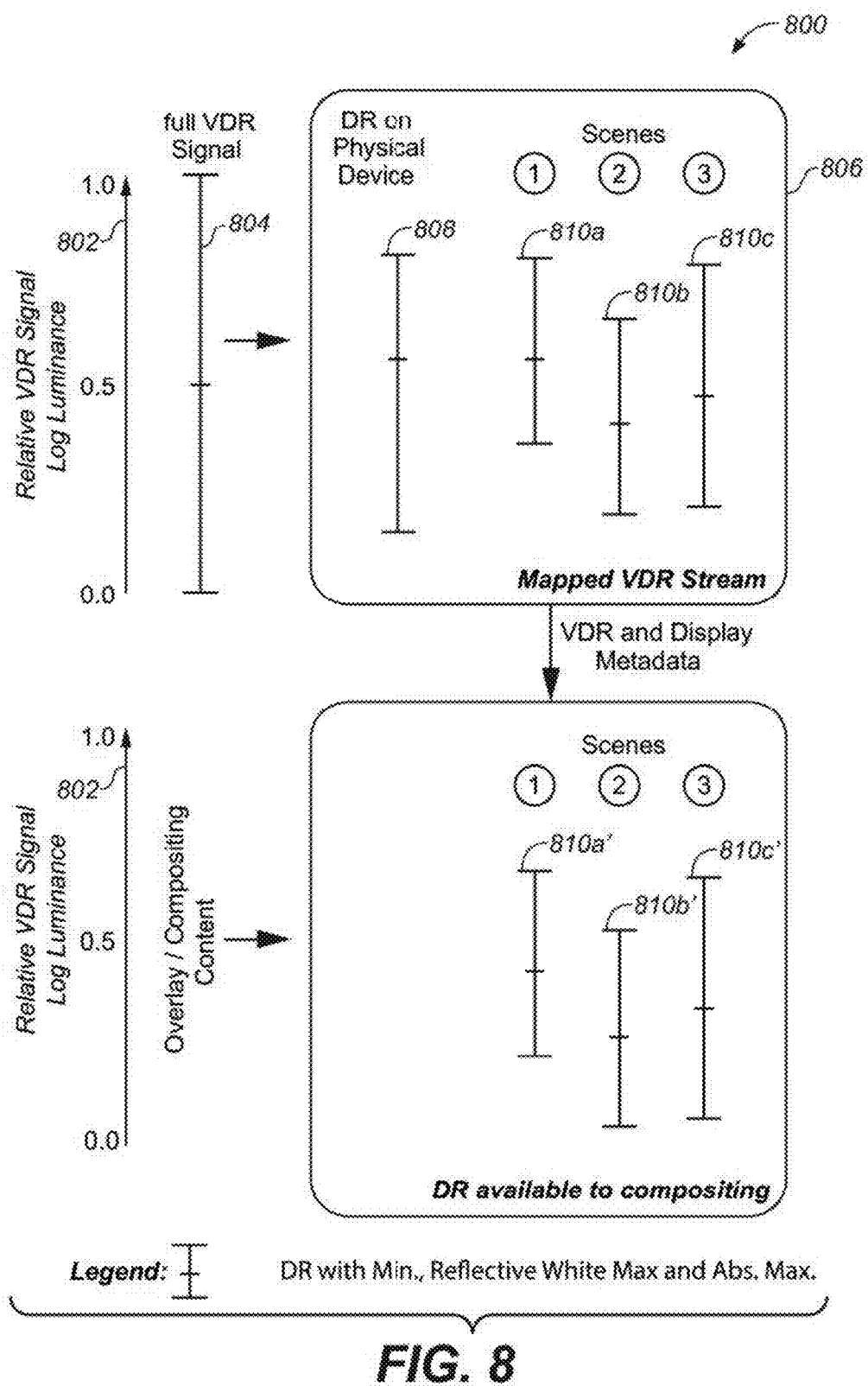
FIG. 8 depicts one exemplary embodiment of the appearance mapping of with respect to dynamic range, minimum luminance, reflective white point and absolute maximum.

FIG. 8 depicts one exemplary embodiment of the appearance mapping of overlay/composite image/data onto first image/video data for rendering onto a device with respect to dynamic range, minimum luminance, reflective white point and absolute maximum. All dynamic range bars shown in FIG. 8 are related to the reference dynamic range shown in 802 here reflecting the full VDR signal range 804. Each dynamic range bar is illustrated as ranging from a minimum to a maximum luminance. The middle intersection line within a dynamic range bar references a luminance value representing reflective white.

FIG. 8 illustrates how scene-by-scene dynamic ranges may be mapped on a display comprising a dynamic range as expressed as 808. The input VDR signal 804 may potentially be mapped to the maximum dynamic range 808 of the physical display device. However, based on the actual dynamic range present in the input VDR scene, the display management (DM) module may allocate different dynamic range intervals and reflective white points to each scene on the primary displays, illustrated by Scene 1, 2 and 3 (810a, 810b and 810c, respectively).

This mapping information may be sent to the compositor (or any module having processing similar to the compositor as previously mentioned). This compositor (or the like) may receive as input the overlay/composite content and map this content into DR ranges illustrated by 810a', 810b' and 810c', respectively.

It should be noted that the dynamic range of the actual content on overlay/composite input image data (e.g. UI, CC, text, etc.) may not use the full dynamic range of the display. Instead, the system selects a range that will tend to be a perceptual match in dynamic range and lightness as close as possible to the first image data and the capabilities of the display.

Embodiment of Chroma Mapping

Figure 9:
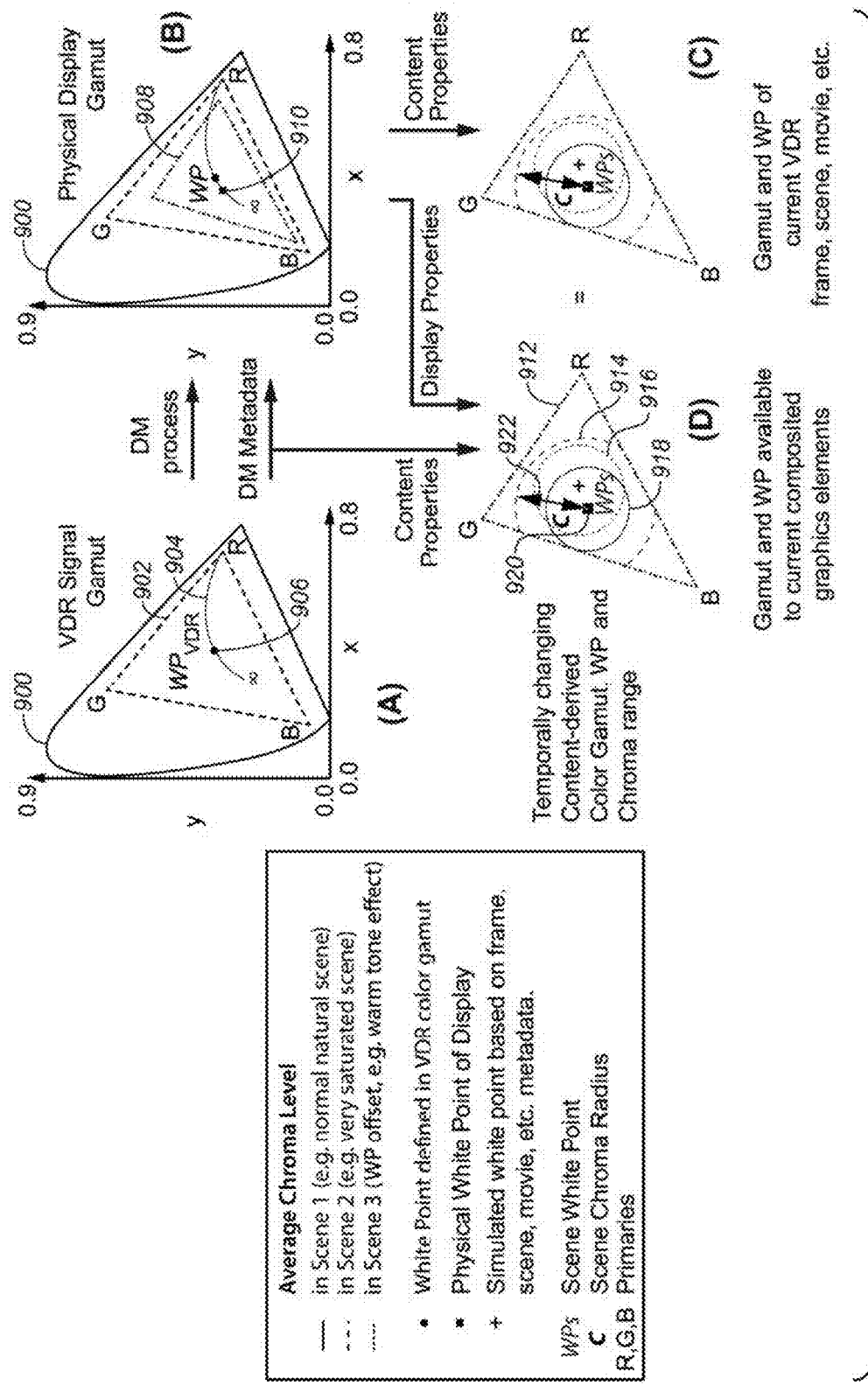
FIGS. 9A, 9B, 9C and 9D depict one exemplary embodiment of the appearance mapping of with respect to color gamut.

In addition to visually pleasing mapping with respect to dynamic range, it may also be desirable to map and/or composite the image/video data to a visually pleasing color gamut. FIGS. 9A, 9B, 9C and 9D depict one exemplary embodiment of the mapping of overlay/composite image/video data onto a first image/video data for rendering onto a display device with respect to color gamut. FIG. 9A represents the color gamut (e.g., 902 as placed within the CIE xy Chromaticity Diagram 900) as may be present in the first image/video data stream. This image/video data may comprise a white point 906 which may lie anywhere on the blackbody curve 904 or anywhere else inside the chromaticity diagram.

During DM processing (as depicted by FIG. 9B), the color gamut may shrink with respect to the full color gamut available in the first image/video data. This possibly smaller color gamut 908 may express the limitation of the physical display gamut—and it may also exhibit a different white point 910.

FIG. 9C factors in the small gamut exhibited by the display and, during dynamic color mapping of the first image content (as may occur on an image-by-image, scene-by-scene basis). It may be seen that the overall chroma vector for a given image (C) and the outer range of the color gamut may change from image-to-image (as denoted by the various solid and dotted gamut circles).

When the composite image (i.e., the first image/video data and the overlay data) is to be mapped onto the display, a further gamut mapping (as shown in FIG. 9D) may occur. As with FIG. 9C, various color gamuts (i.e., 914, 916, 918) may appear image-by-image—each with its own possible overall gamut vector C and white point WP, to fit within an overall gamut 912. In order to have the overlay/composited graphics perceptually match the actual gamut of the DM'd VDR stream, it may be desirable to have the frame/scene gamut, chroma and/or whitepoint settings be substantially the same or at least similar between FIGS. 9C and 9D.

Possible Advertising Example/Embodiment

Figure 10A:
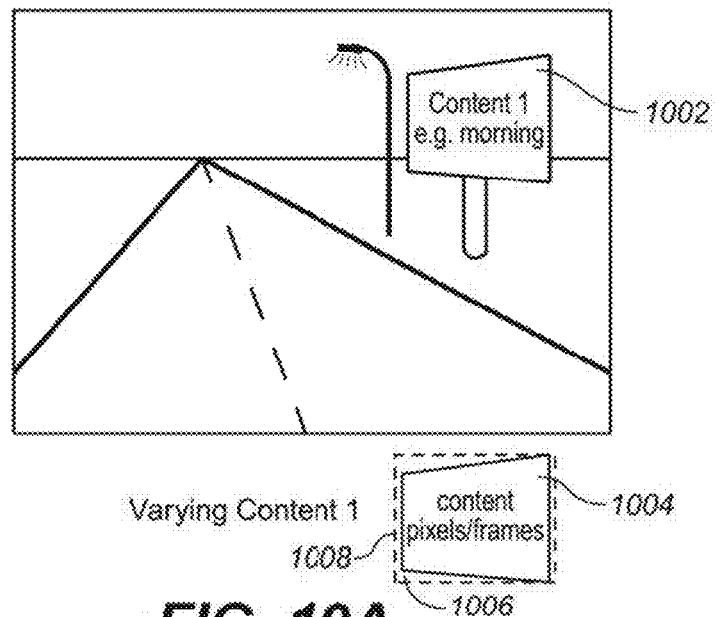
FIGS. 10A, 10B and 10C depict one exemplary embodiment of performing dynamic content replacement.
Figure 10B:
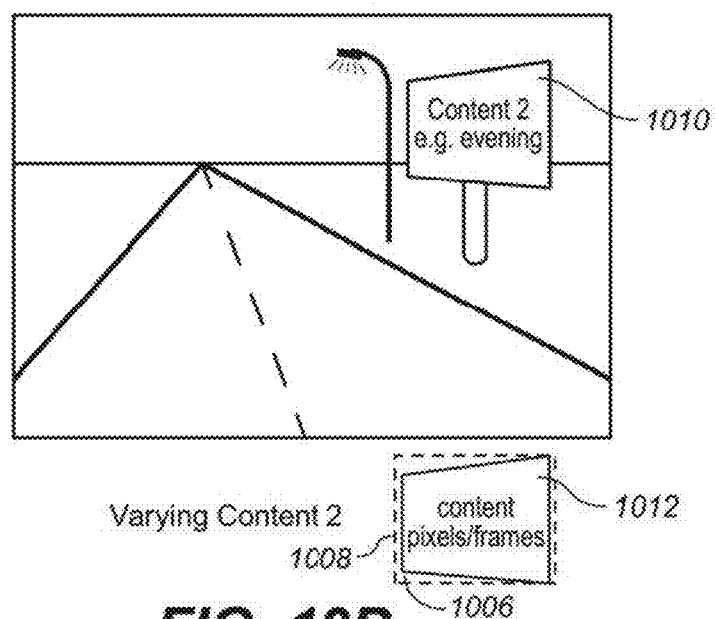
Figure 10C:
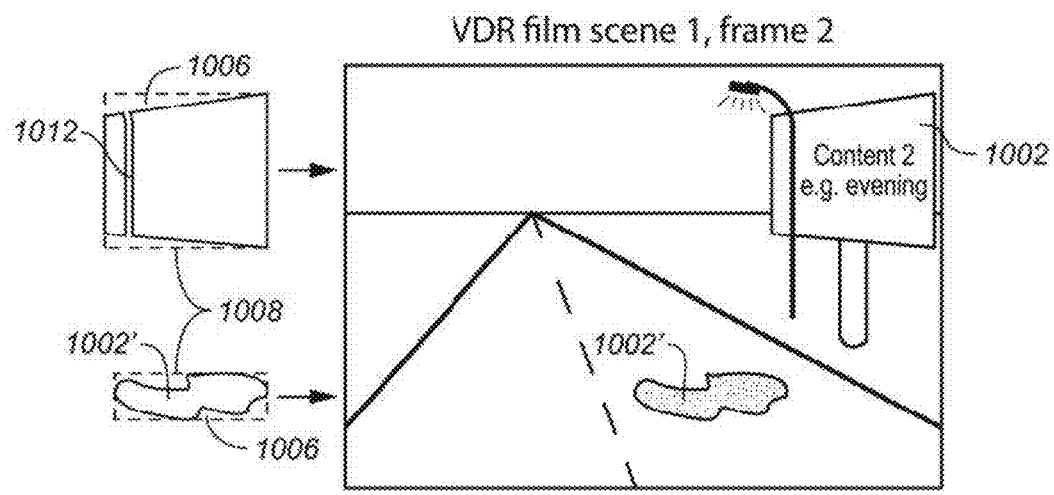

As one possible application of the composite image processing mentioned herein, it may be possible and/or desirable to consider dynamic content replacement with images/scenes and/or movies. One exemplary case would be to place advertisements in existing content—or replace advertisements that are in existing content, with other advertisements. FIGS. 10A, 10B and 10C depict one embodiment of a dynamic content replacement that may be affected by the present systems and/or methods—in this case, the new content is advertisement. In other embodiments, besides advertising, any other content may be superimposed—e.g., weather information, stock market information, website and social media content, etc. Such information may also be dynamically inserted and/or updated as desired. In one embodiment, dynamic mapping may be the replacement of the first image/video data, or alternatively, a second, overlay image/video data—e.g., that may have already been composited with a first image/video data—with a third and/or different image/video data. Such replacement of one set of image/video data with another set of image/video data may be total replacement—or a replacing just a subset of the replaced image/video data. In one embodiment, a present system may comprise a dynamic mapping module that is capable of such replacement of one set of image/video data with another image/video data, as described herein.

FIG. 10A depicts one exemplary image/scene (e.g., in this example, a scene of a road and an advertising billboard 1002). Billboard 1002 represents an area within this image/scene for an opportunity to overlay different advertisements—as desired by the content originators and/or owners. For example, it is possible to place "targeted" ads to a viewer/consumer (if such information regarding the viewers, their likes and dislikes may be known, guessed or statistically derived—e.g., by analyzing social media networks). In another example, it may be possible to update images over a longer period of time. One such example might be updating older movies, TV content or other such older/legacy content that had in its billboard a now-bankrupt/defunct company. To update the movie (and make it seem presently relevant), new billboard content may be added to that area, thus overwriting the old image data within the billboard.

In FIG. 10A, it may be seen that the billboard content may be comprised of the actual pixel information 1004 representing the advertisement, and an alpha channel 1006 which may be combined by a bounding box 1008. This bounding box may define a region of performing image processing for the proper overlaying and/or compositing of advertisement upon the billboard. All pixels inside 1008 (as well as the actual size of it) may change from frame-to-frame.

FIG. 10B shows the content of FIG. 10A with the difference of a swapped content (e.g., instead of 1002, it is possible to have 1010). It should be appreciated that the main scene frame may be kept substantially the same, while the advertisement (or other content) may be dynamically changed. For example, content 1002 may be substantially 1004—and content 1010 may be substantially 1012. In one embodiment, the information displayed as 1002 or 101 may be provided to a compositor (e.g., 110, or the like) as external content 106. This may be in the full signal specification, as the original VDR stream 102 or any possible subset of it (e.g., super- or sub-sampled, lower bit depth, or any other form of compression); although a luminance and/or color reference may be provided in order to composite 1008 into the first image/video data.

FIG. 10C depicts another aspect of the processing for dynamic advertising—e.g., as one frame compared with a subsequent frame of a same scene (perhaps e.g., 10 frames later or the like). As may be seen in FIG. 10C, there may be an object (e.g., the lamppost) within the area of the billboard. In addition, there may be another part of the image that may interact with the image of billboard (e.g., puddle 1002'— which may reflect the image on the billboard). In this case, it would be desirable for the present system to maintain proper processing of these effects. For example, line 1012 may be considered in permanently in the foreground of the billboard image, without regard to the particular advertisement that may go onto the billboard. In addition, the present system may include a separate region into the bounding box structure 1008—in order to properly composite new and/or different advertisements onto the billboard.

Another embodiment may be to provide a texture that may then be mapped into place on the billboard by using a geometric transform module, such as—e.g., a Graphics Processing Unit (GPU).

In addition, for real time compositing into existing EDR video stream, the appearance/DM metadata in combination with alpha channels may be used to composite information into the video image. This may be used to aid in swapping advertisements on billboards appearing in movie footage. If the appearance parameters of the movie are known, the advertisement may be mapped without the viewer realizing that composition. With increasing computing power in playout devices, this is feasible in the near future.

Adding Additional Content to Existing Image/Video

When restoring and/or reformatting legacy image/video content, It may be desirable to identify areas within such legacy content to add new, additional content. For example, it may be possible to can identify valuable advertising areas in legacy movies/TV shows. In one embodiment, a geometric mapping function for VDR-graded movies may be employed to help perform this compositing. A pixel/vertex shader program (e.g., as often used in computer graphics/games) may also be employed to aid in the compositing of new content into such VDR streams, as discussed below.

Figure 11:
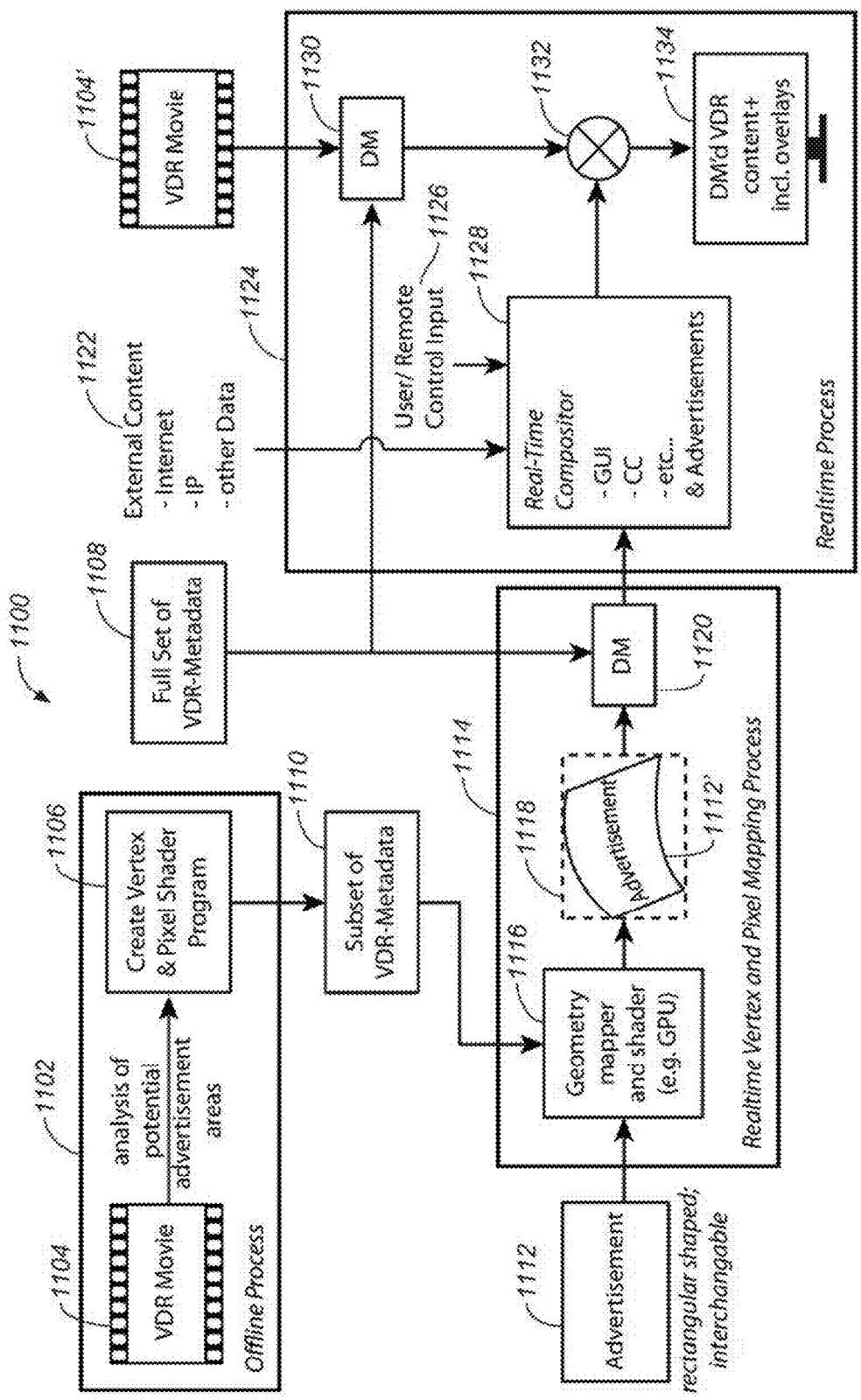
FIG. 11 is another embodiment of dynamic content replacement.

FIG. 11 is one embodiment (1100) of a performing the identification of areas for new content and performing the composite of such new content into existing and/or legacy content.

When restoring/regrading legacy content, system 1100 may identify valuable advertising areas in collaboration with the owner of the movie/TV show 1104. This may be performed by an off-line process 1102 and may be used to create a vertex and pixel shader program 1106. Such a shader program would describe how to map any texture (e.g. a rectangular image 1112) into the 2D shapes needed to composite it into a VDR stream. In one embodiment, creating such shader program 1106 may come at a minor additional cost/effort as it only has to be done for areas of (e.g., advertisement) interest and not the full movie. This may be an automatic, semi-automatic (using computer vision approaches such as feature tracking, motion vector analysis, etc.), or manual (carried out by an artist).

Vertex and Pixel Shader program 1106 is then provided with the movie/TV show, creates a subset of VDR metadata which is provided either as metadata attached to the VDR stream or via external means (e.g. internet).

This mapping function (1106) can now be used to go from a rectangular texture (1112) to the appropriate mapped pixel data (112') in an appropriate bounding box (1118) by using the vertex and pixel shader program (1106) in conjunction with a geometry mapper and shader (1116).

The final bounding box (1118) may now be mapped into the dynamic range and/or color gamut (or other image characteristic) using a DM module (1120) to match or substantially match the mapped output of the first image/video data (1104', after 1130). It should be noted that both DM modules (1120 and 1130) may use the same or similar set of VDR metadata 1108 in order to create a matching mapping result. Now it may be composited into the VDR movie (1132) in conjunction with any other desired composites (e.g. GUI, CC, etc. using inputs such as 1122 and 1126) in the same way as described in FIGS. 10A, B and C by using image compositor module (1128). This results in the VDR movie including the perceptually correct composited advert that may be displayed (1134).

In one embodiment, program 1106 may be reused (once created) indefinitely with any new content 1108. Advertisers only have to provide a texture and, in some embodiments, appearance mapping data (e.g., accurate colorimetric description of elements of their advertisements, such as logos or products). It would be possible to appropriately map that texture into the VDR movie using the vertex and pixel shader programs created while restoring/regrading the movie to VDR. It should be noted that this embodiment is not limited to single frame textures. It is also valid using advertisement clips (e.g., short films).

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method for overlaying a second image over a plurality of first images, the method comprising:
   receiving said plurality of first images and said second image, said first images differing in dynamic range and size from said second image, the plurality of first images being temporally related and forming a first scene;
   mapping a dynamic range of the first scene to a dynamic range of a display to generate adjusted first images, wherein said mapped dynamic range of the first scene is different from a maximum dynamic range of the display;
   performing appearance mapping of said second image to determine an adjusted second image that differs in dynamic range from said second image, wherein performing appearance mapping of said second image (i) is performed according to mapping information about the mapped dynamic range of the first scene and image statistics regarding the second image, the image statistics including at least one of average luminance, minimum luminance, mean luminance, maximum luminance, dynamic range, reflective white, color temperature, whitepoint, color gamut and color palette, and (ii) involves selecting a dynamic range based on both the dynamic range of the first scene and the capabilities of the display; and
   forming a composite image by overlaying said adjusted second image onto a portion of at least one of said adjusted first images.

2. The method of claim 1 wherein said first images comprise one of a group, said group comprising: High Dynamic Range (HDR) images, Extended Dynamic Range (EDR) images and Visual Dynamic Range (VDR) images.

3. The method according to claim 1, wherein all method steps are repeated for at least one further scene of first images, to implement a scene-by-scene overlay method.

4. The method of claim 1 wherein said second image comprises one of a group, said group comprising: graphics, close captioning, text, video overlay, Graphical User Interface (GUI), television (TV) guides, signals from broadcasting company, signals from content creation, subtitles, signals from set top box and signals from Audio-Video (AV) receiver.

5. The method of claim 1 wherein performing appearance mapping further comprises:
   mapping the dynamic range of said second image in accordance with the dynamic range of said adjusted first images.

6. The method of claim 1 wherein performing appearance mapping further comprises:
   mapping the color gamut of said second image in accordance with the color gamut of said first adjusted images.

7. The method of claim 1 wherein performing appearance mapping further comprises:
   mapping the luminance of said second image in accordance with the luminance of said first adjusted images.

8. The method of claim 1 wherein said method further comprises:
   receiving metadata regarding said display characteristics.

9. The method of claim 8 wherein said metadata regarding said display's characteristics comprises one of a group, said group comprising: average luminance, minimum luminance, mean luminance, maximum luminance, reflective white, color temperature, whitepoint and color gamut.

10. The method of claim 9 wherein performing appearance mapping further comprises:
    mapping said second image in accordance with said metadata regarding said display's characteristics.

11. The method of claim 1 wherein said method further comprises:
    performing dynamic mapping of a third image to composite said third image with said first images, said third image intended to replace a part of said second image previously composited with said first images.

12. A system for overlaying a second image over a plurality of first images, said system comprising:
    a display management module capable of receiving said plurality of first images, which are temporally related and form a first scene;
    a compositor module capable of:
       receiving said second image, the second image differing in size and dynamic range from each of the plurality of the first images;
       mapping a dynamic range of the first scene to a dynamic range of a display to generate adjusted first images, wherein said mapped dynamic range of the first scene is different from a maximum dynamic range of the display; and performing appearance mapping said second image to form an adjusted second image, said adjusted second image differing in dynamic range from said second image, wherein performing appearance mapping of said second image (i) is performed according to mapping information about the mapped dynamic range of the first scene and image statistics regarding the second image, the image statistics including at least one of average luminance, minimum luminance, mean luminance, maximum luminance, dynamic range, reflective white, color temperature, whitepoint, color gamut and color palette and (ii) involves selecting a dynamic range based on both the dynamic range of the first scene and the capabilities of the display; and a mixing module capable of mixing said adjusted second image onto at least one of said adjusted first images to form composite images, said composite images intended to be rendered upon said display.

13. The system of claim 12 wherein said compositor module is capable of performing appearance mapping wherein said appearance mapping further comprises one of a group, said group comprising: luminance mapping, dynamic range mapping and color gamut mapping.

14. The system of claim 12 wherein said system further comprises:

a dynamic mapping module capable of replacing a part of said second image that has been composited with a first image, with a third image.

* * * * *